United States Patent [19]
Toman

[11] 3,820,074
[45] June 25, 1974

[54] REMOTE OPERATING CONDITION DATA ACQUISITION SYSTEM

[75] Inventor: Donald J. Toman, Pleasantville, N.Y.

[73] Assignee: Tull Aviation Corporation, Armonk, N.Y.

[22] Filed: Mar. 20, 1972

[21] Appl. No.: 236,108

Related U.S. Application Data

[63] Continuation-in-part of Ser. No. 205,081, Dec. 6, 1971, abandoned, and a continuation-in-part of Ser. No. 217,615, Jan. 12, 1972, abandoned.

[52] U.S. Cl. .................................. 340/151, 340/409
[51] Int. Cl. ............................................ H04q 9/00
[58] Field of Search ........... 340/151, 152, 183, 409, 340/163; 179/2 R; 325/55, 133, 363, 2, 6, 53; 343/177; 178/71 T

[56] References Cited
UNITED STATES PATENTS

| | | | |
|---|---|---|---|
| 2,883,651 | 4/1959 | Akerlund | 340/413 |
| 2,970,260 | 1/1961 | Flint | 324/73 |
| 2,987,704 | 6/1961 | Gimpel et al. | 340/172.5 |
| 3,253,260 | 5/1966 | Hawley | 340/151 |
| 3,293,605 | 12/1966 | Moore | 340/150 |
| 3,317,672 | 5/1967 | Cestaro, Jr. | 340/183 X |
| 3,435,416 | 3/1969 | Kretch et al. | 340/163 |
| 3,438,019 | 4/1969 | Gowan | 340/214 |
| 3,524,023 | 8/1970 | Whang | 179/2 |
| 3,532,827 | 10/1970 | Ewin | 340/151 X |
| 3,541,513 | 11/1970 | Paterson | 340/151 |
| 3,561,875 | 2/1971 | Ried, Jr. et al. | 340/147 X |
| 3,573,817 | 4/1971 | Akers | 340/420 |
| 3,588,357 | 6/1971 | Sellari, Jr. | 340/150 X |
| 3,593,293 | 7/1971 | Rorholt | 340/152 R |
| 3,611,363 | 10/1971 | McCrea | 340/213 X |
| 3,644,894 | 2/1972 | McCrea | 340/163 |
| 3,676,878 | 7/1972 | Linder | 340/413 |

*Primary Examiner*—Donald J. Yusko
*Attorney, Agent, or Firm*—Curtis Ailes

[57] ABSTRACT

Data readings indicative of a plurality of different operating conditions of a radio navigation aid transmitter are automatically taken and means are provided for converting the data readings to a form which can be transmitted over a non-dedicated voice band-width communication link. An interface means is coupled to the converting means and operable to establish a connection with a communication link for transmission of the data readings.

18 Claims, 3 Drawing Figures

REMOTE OPERATING CONDITION DATA ACQUISITION SYSTEM

This is a continuation in part of application Ser. No. 205,081 filed on Dec. 6, 1971 and of application Ser. No. 217,615 filed Jan. 12, 1972 both now abandoned.

This invention relates to control and remote data acquisition systems which are particularly useful for electronic apparatus such as navigational aid transmitters.

It is anticipated that electronic navigational aids, such as instrument landing systems, will be provided at more and more airports. However, one of the major problems in this is the expense of continually checking the equipment to make sure that it is functioning properly and to try to prevent breakdowns.

It is also important that whenever the equipment is not operating satisfactorily, so that it is likely to give erroneous information, it should be shut down so as to prevent the transmission of erroneous guidance information. The present invention is directed to these problems.

It is the present common practice to have a serviceman on duty at all times to keep track of the operation of radio navigational aid transmitters, such as instrument landing systems transmitters, which may be operated at, or near, airports which they serve. This full-time serviceman must take daily test voltage readings at various parts of the system for the purpose of determining that the system is operating correctly, and also for the purpose of making a monthly report of the daily readings to the Federal Aviation Administration.

It is one object of the present invention to provide for remote surveillance of electronic apparatus such as radio navigational aid transmitters and remote accumulation of the transmitter condition voltage readings for the generation of reports for government regulating agencies such as the U.S. Federal Aviation Administration and for other purposes. The remote surveillance permits the accumulation of data for a number of transmitters at a single central station where the data can be quickly and expertly analyzed for the purpose of anticipating service difficulties.

It is another object of the invention to provide for the gathering of the data at a particular pre-determined time of day, and to permit interrogation of the local data reading system by a central station over ordinary non-dedicated telephone lines at a different time of day.

It is another object of the present invention to provide for remote surveillance of a plurality of radio navigation aid transmitters at a single central station, employing voice band-width communication links such as ordinary telephone lines for transmission of data, and avoiding the expense of dedicated communication links.

It is another object of the invention to provide an improved control and remote data acquisition system for radio navigation aid transmitters which is operable in conjunction with a transmitter monitor to take readings from the system at the time the monitor shuts the system down because of a malfunction so that the difficulty which caused the malfunction can be diagnosed at the central station.

It is another object of the invention to provide a system which is effective to detect and record one or more special events which affect the operating conditions of the navigation aid transmitter so that information about special events is later available for the diagnosis of problems with the navigational aid transmitter.

Further objects and advantages of the invention will be apparent from the following description and the accompanying drawings.

In carrying out the invention there is provided a control and remote data acquisition system for radio navigation aid transmitters comprising means for sequentially taking data readings indicative of a plurality of different operating conditions of a radio navigation aid transmitter, means coupled to the sequential data reading means for converting the data readings to a form which can be transmitted over a telephone line, a telephone interface means coupled to the converting means, said interface means being operable to establish a connection with a telephone line for transmitting the converted data readings over the telephone line.

Figure 3:
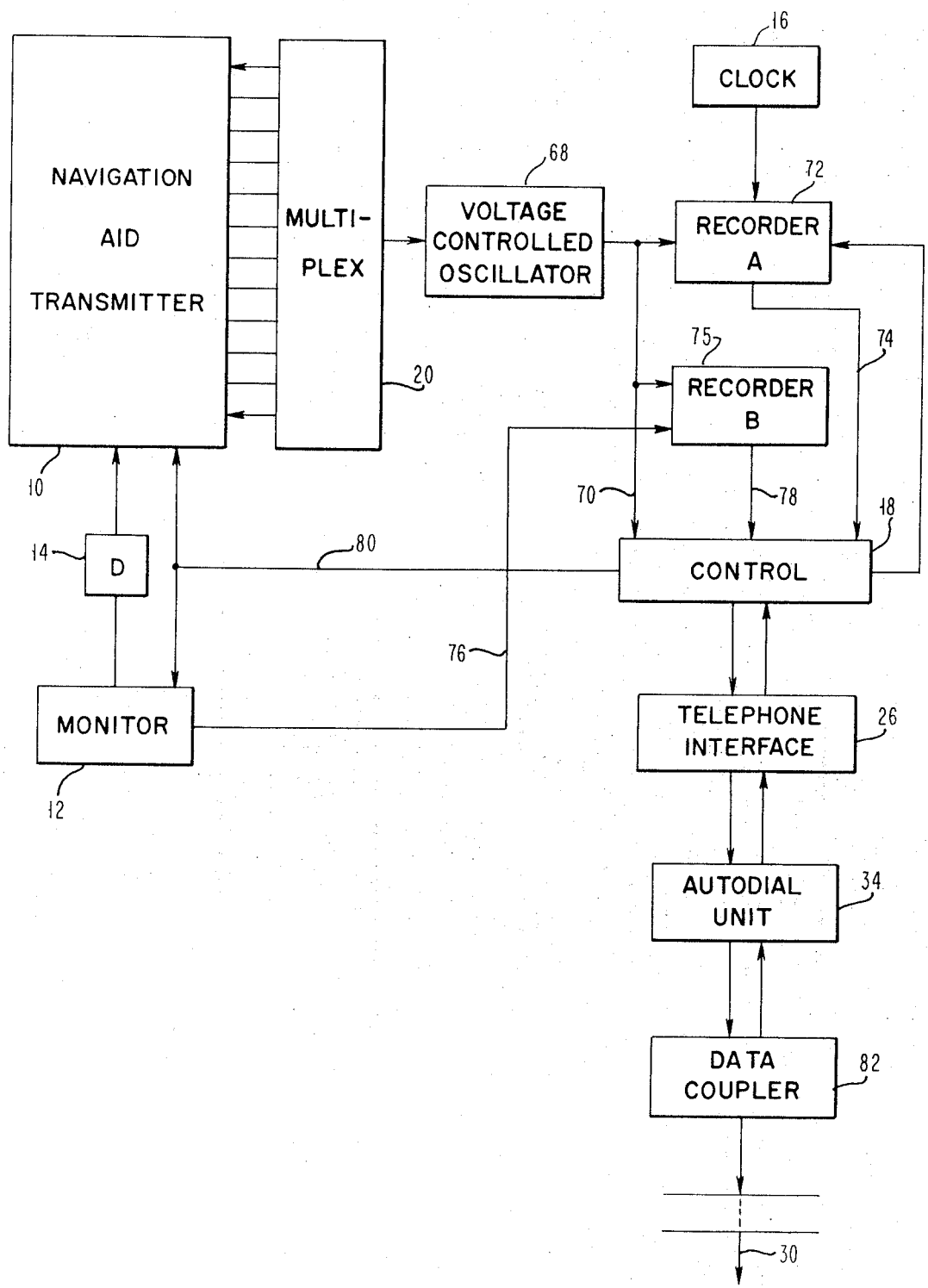

And FIG. 3 is a schematic diagram of a modification of the invention.

Figure 1:
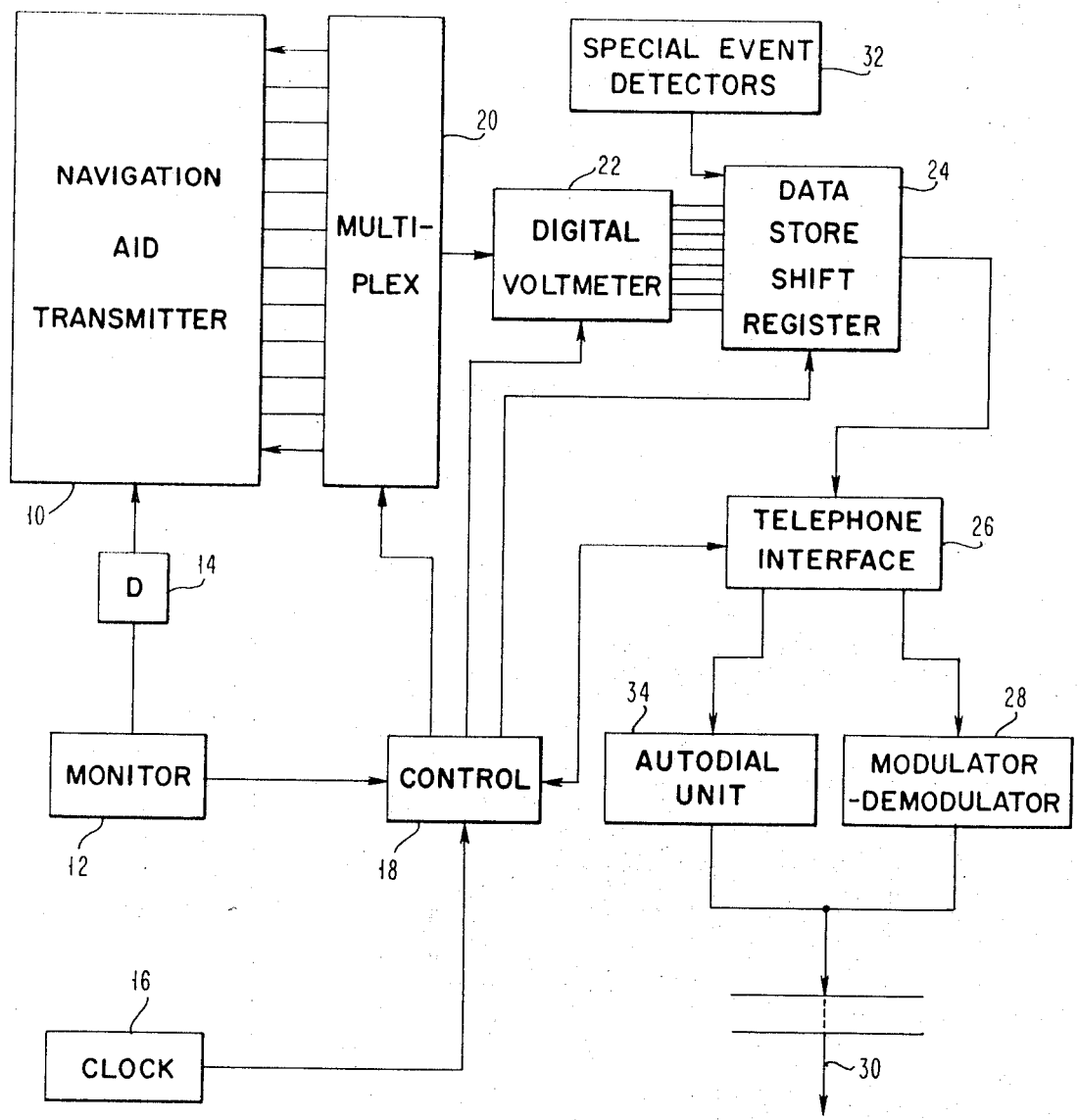
FIG. 1 is a schematic diagram illustrating one form of the invention.

Referring to FIG. 1 of the drawings, a navigational aid transmitter is schematically indicated at 10. A monitor 12 is provided, which may consist of one or more ground-based receivers, to detect whether the transmitter 10 is functioning correctly. When the monitor detects that transmitter 10 is not functioning correctly, it emits an error signal through a delay circuit 14 to shut down the transmitter 10 after a suitable time delay.

The system is also operable under the control of a clock 16, and a control unit 18, to make a series of electrical measurements within the transmitter 10 at periodic intervals, such as once a day. When these measurements are made, they are automatically transmitted in sequence through a multiplex switch 20 to a digital voltmeter 22. From digital voltmeter 22, the measurements are recorded as eight bit words in a data storage shift register 24. At some time during the day, from a remote central station, a telephone connection is established to the data store 24 through the telephone interface unit 26, a data transmission unit 28, which is a modulator-demodulator unit, and a telephone connection 30. The data may be recorded for purposes such as reports to the Federal Aviation Administration, and it may be analyzed for indications of trouble in the transmitter at the central station. Conventional telephone lines may be employed for transmission of the data to the central office.

In addition to voltage and current measurements which are taken at a predetermined time as measured by the clock 16, special event detectors 32 are provided for the purpose of indicating the occurrence of a special event which may cause trouble with the transmitter. These special events may include for instance, the presence of an intruder, the presence of a very high temperature condition, or the occurrence of a high velocity wind gust. Whenever one of these special events is detected, a special binary digit is set in the data store shift register indicating the occurrence of that particular special event, and a digital clock reading is also recorded in a special field of the data store shift register from clock 16, indicating the exact time of the special event. The special event data is thus automatically transmitted to the central station along with the voltage and current measurements whenever the data transmission from the data store shift register is made.

Whenever the monitor 12 detects a malfunction of the system which is of sufficient importance to shut the system down, it also actuates the control 18 to cause a special operation of the multiplex switch 20 to cause the recordation of the voltages and currents present in the transmitter at that time. This testing and data recording procedure occurs during the time delay afforded by the delay device 14. The data thus recorded displaces any data previously recorded in the data store shift register. In this contingency of shutdown by the monitor 12, the control 18 also causes the telephone interface 26 to operate through an autodial unit 34 to call out from the location of the apparatus to the central station through connection 30 to transmit a message to the central station indicating that the transmitter has been shut down by the monitor, and to also transmit the data stored in the shift register 24. With the information contained in the data transmitted to the central station, a determination can be made as to the nature of the problem, including the possibility that some special event of a transitory nature may have caused the failure, and that the transmitter can be safely returned to service without local attention from a service man. If this is not possible, the data will show the nature of the problem and will indicate which of a limited number of replaceable units must be replaced or repaired in order to return the equipment to service.

It is anticipated that, particularly in the absence of a breakdown, the interrogation of the system illustrated may be carried out from the central station by means of a computer, the computer including a section of memory assigned for the storage of all of the day-to-day test data from each particular transmitter. At the end of a month, or other prescribed reporting period, the data may be removed from the computer memory section assigned to each particular transmitter and recorded for the purpose of reporting the data to the Federal Aviation Administration.

In response to commands received over the telephone line through the telephone interface Unit 26, the control 18 is preferably capable of carrying out various commands, including a command to shut down the navigational aid transmitter 10, or to restart the navigational aid transmitter 10 after it has been shut down automatically by the monitor 12, if it appears that the troubles were transitory in nature.

The modulator-demodulator unit 28 (sometimes referred to as a "modem") is capable of translating outgoing digital signals to tone signals for transmission on the telephone line 30. Unit 28 is also capable of translating or demodulating incoming tone signals to digital pulse signals. Units 28 and 34 are both commercially available from Bell Telephone system companies and others.

Figure 2:
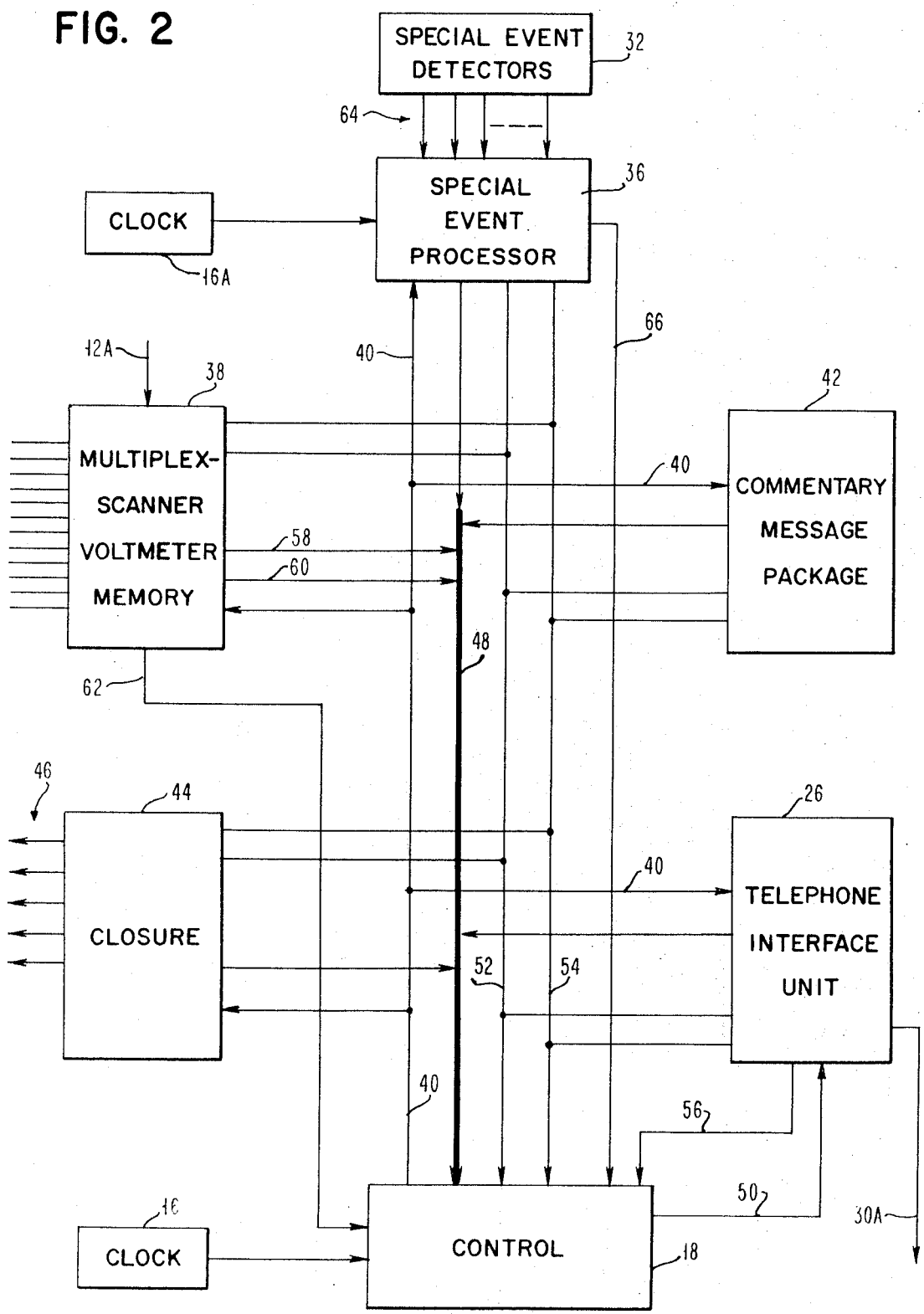
FIG. 2 is a schematic block diagram illustrating further details of portions of the embodiment of FIG. 1.

FIG. 2 illustrates in schematic block diagram form further details of the preferred embodiment of the invention, including the elements necessary to carry out the functions of the components of FIG. 1 including clock 16, control 18, multiplex 20, digital voltmeter 22, data store shift register 24, telephone interface 26, and special event detector 32. In the preferred detailed embodiment of this portion of the system shown in FIG. 2, all of the special event data from the special event detectors 32 is handled by a separate special event processor 36, and the special event data is stored in the special event processor. The other data storage memory functions are provided in a multiplex-scanner voltmeter memory unit 38. Unit 38 combines the functions of the multiplex unit 20, the digital voltmeter 22, and the data storage functions of the shift register 24 (exclusive of the special event data) of the system of FIG. 1.

All of the operations are carried out in response to command signals from the control 18. These commands appear on a command bus connection 40 which is common to all of the other functional units. All data and communications transmitted to the outside telephone line at 30A are carried out through the telephone interface unit 26. All such data is funneled through the control unit 18.

A read only memory circuit is indicated at 42 and identified as a commentary message package. Thi unit is provided for the purpose of sending out, on command, pre-recorded messages from the transmitter station through the telephone line from the control 18. Such messages may include for instance, an indentification of the particular transmitter station, and specific messages such as "We have had a monitor shut down", or a message initiated by a branching circuit when an unrecognized request or command is received from the central station stating "I don't recognize your message" or "Your command has been carried out and we await further instructions from you". The above list of messages is illustrative only. The messages may be transmitted in code.

Commands received from the central station are carried out through the control unit 18 by a closure unit 44. Unit 44 emits control signals on lines 46 to open or close switches and to thus carry out commands received from the central station. Such commands may include, for instance, shutting down or re-starting the monitor, shutting down the navigational aid transmitter by cutting the main power, or restarting the navigational aid transmitter after it is shut down by the monitor. The closure unit 44 also includes a storage register which causes the commands to be carried out and which also continues to store a record of the state of the commands which can be interrogated and read out in response to a request from the central station.

The control of unit 44 and the other units 38, 36, 42, and 26 is carried out through control unit 18 by commands transmitted on the operations bus 40. Such commands normally include an identification code indicating which unit is addressed, and then operations codes commanding the addressed unit to carry out a particular operation. Where the command is for the transmission of data back to the control unit 18, that data is transmitted on a common data bus 48. While it is shown as a single heavy line in the drawing, it is intended to be a multiple conductor connection which is capable of receiving eight binary bits in parallel. Since an alpha-numeric character may be represented by eight binary bits, this mode of transmission may be referred to as serial by character. If the data is to be transmitted on through the control unit 18 and the communications unit 26 to the telephone line, it is converted to a straight serial form within the control unit 18. The resultant serial stream of data is transmitted through a connection 50 to the communications unit 26, and thus to the outgoing telephone line connection indicated at 30A.

The parallel readout of data to the data bus 48 from the various units such as unit 38 provides a method by which the control unit is enabled to recognize groups of data as distinct groups, as opposed to a continuous stream of serial binary bits. With a continuous stream, some provision must be made to identify a beginning point to establish a timed sequence.

Whenever a command is directed from the control unit 18 to any one of the other units on the command operations bus 40, the first step is the emission of a signal identifying the unit which is addressed. The unit which is addressed then sends back a signal on a ready flag bus 52. This ready signal is preferably coded to indicate to the control unit that the correct addressed unit is responding to the address command. The ready signal, in effect, conveys the message back to the control unit that the unit which has been addressed has received the address command and is ready to respond to further commands, whatever they may be. If the command is one to read out data, it means that the data is ready to be read out. After the addressed unit has carried out its command function, it presents another signal to the control unit 18 on the task finished flag bus 54. This indicates to the control unit that the assigned task has been completed so that the control unit 18 can proceed with whatever comes next. This may very well consist of addressing the same unit or another unit with a different task.

The chief tasks of the telephone interface unit 26 are to initiate outgoing calls on command, and to cause the system to be aware of incoming calls, and to establish connections with incoming calls in response to commands from the control unit 18. For this purpose, a special connection 56 is provided from the telephone interface unit 26 to the control unit 18, which may be referred to as an answer flag conductor. Whenever there is an incoming call, the telephone interface unit 26 promptly provides a signal on this answer flag conductor 56 to the control unit 18. Whenever this occurs, the control unit 18 initiates an answering routine as soon as it has completed any task which is then in progress. The answering routine preferably includes the delivery to the telephone line of a pre-recorded message from the message unit 42 identifying this particular station for the benefit of the calling party (which may be a central station computer). If the calling party is satisfied with this information, the calling party sends a coded message which is recognized by the control 18 as identifying a calling party which is entitled to give commands and to receive data. If this condition is satisfied, a message of recognition is trenamitted from the message unit 42 back to the calling party indicating a request for a command from the calling party. The calling party, the central station, may then request information, or command various control operations which are executed through the closure unit 44. If the calling party does not provide the correct identification, the call is terminated.

The multiplex-scanner voltmeter memory unit 38 preferably combines the functions of the units of FIG. 1 including the multiplex unit 20, the digital voltmeter 22, and the data storage shift register 24 (excluding that portion of storage required for recording special events.) In the preferred detailed form of the invention, the unit 38 includes two separate and distinct memories for recording and retaining complete sets of test values taken from the navigational aid transmitter. One of these sets of values is stored in what is called Memory A, the contents of which are available on an output connection 58 to the data bus 48, and the other of which is identified as Memory B, from which the data is available on an output connection 60. Memory A is the memory which receives the transmitter data on a routine basis at timed periodic intervals. The recording of the Memory A data is initiated by a signal from clock 16 to the control unit 18 indicating that it is time for the next set of data to be recorded. The control unit 18 then issues the appropriate commands on the command operation bus 40 to the unit 38 to cause the unit 38 to initiate and carry out the data reading cycle. The loading of Memory A causes the displacement of data previously stored in that memory with the new data. The new data is then available for the entire interval until the clock 16 again indicates that it is time for a new set of data to be recorded. At any time during that interval, the central station may request and receive a read out of the data in Memory A.

While Memory A is described in terms of storage of a single set of data at a time, it will be understood that a number of sets of data together with the reading time of each set, may be stored in Menory A, if desired. Thus, the system may automatically take a set of readings on several successive days, the readings being available to the central station whenever requested. Thus, if telephone service is interrupted for several days, the data for the days of interruption is not lost.

If the monitor has determined that it appears to the monitor that there is a malfunction of the system which is so serious that the transmitter must be shut down, the monitor provides an alarm signal on a connection 12A directly to the unit 38. Thus causes the unit 38 to immediately, and independently of control unit 18, record all of the transmitter test data in the Memory B which is normally recorded in Menory A. Common multiplex, scanning, and voltmeter circuits are employed for the recordings in Memories A and B. The readings for Memory B are taken during a pre-determined time delay period caused by the delay unit 14 of FIG. 1. In response to the alarm signal on connection 12A, the unit 38 emits an alarm flag signal on a connection 62 to the control unit 18. This causes the control unit 18 to initiate the call out routine for the purpose of reporting the transmitter shut down, and for sending to the central station all of the available data indicating the condition of the transmitter at the time of shut down, and prior historical data. Thus, the contents of Memory B available on connection 60 indicate the condition of the transmitter at the time of shut down, while the data in Memory A available on connection 58 indicates the condition of the transmitter at the last previous timed recordation of data. Furthermore, the special event processor memory contains data with regard to the occurrence of various special events relating to conditions of operation of the transmitter which may have been disturbed and which could have caused the shut down.

The special event processor 36 is connected and arranged to receive special event from individual special event detectors 32 on lines 64. Unit 36 is operable to receive and record special event signals completely independent of any commands from control unit 18. The special event processor unit 36 includes its own memory for recording the occurrence of the special events together with a record of the time of occurrence of each special event based on time clock information from clock 16A. While illustrated separately in the drawing for purposes of convenience in representation, it will be understood that clock 16A may be combined with and constitute a part of the clock 16 connected to the control 18.

The memory contained within unit 36 for recording special events is preferably large enough to record several occurrences of every operating condition of the system which may be of serious significance in the successful production of accurate results by the system, and in the detection of causes of possible malfunctions of the system. The special events which are detected may include, but are not necessarily limited to the following: the presence of an intruder which may be a vehicle, a person, or an animal in such a position as to modify the navigation aid transmitter signal pattern; a high wind gust; a high temperature condition; a low temperature condition; a displacement of the antenna of the transmitter, such as by tilting; a tilting or displacement of one or more of the monitor antennas; a power failure; tripping of the over-voltage relay of the transmitter; and tripping of the under-voltage relay of the transmitter.

If any one of the special events occurs with great frequency, it may indicate the prospect of more serious trouble. Accordingly, it is desirable to have a special report sent out in such a situation. Therefore, the special event processor unit 36 memory is cleared periodically when the special event data stored therein is read out in response to a routine call for data from the central station at the time memory A of unit 38 is read out also. If a particular special event occurs frequently enough, the section of the special event memory allocated to recording that particular special event becomes filled. If any such section of the special event memory becomes filled, the special event processor 36 sends out a special filled memory flag signal on connection 66 to the control unit 18. In response to this signal, the control unit 18 initiates an outgoing call to the central station to report the unusual frequency of special events. Special measures may then be taken from the central station to attempt to remedy the situation, such as by dispatch of a serviceman, or by enlisting the assistance of local airport personnel to remedy the condition being recorded as a special event.

The above explanation assumes that the special event memory is divided into compartments, with different compartments being allocated to the recording of particular special events. However, a preferred arrangement of this memory is to devote the entire memory to the recordation of all special events, recording an identification code along with each special event in memory to identify which special event is being recorded. With this arrangement, the special event memory flag indicating that the memory is full does not occur until all positions in the special event memory ar filled.

While not illustrated in FIG. 2, there is preferably provided a serviceman's plug-in communication and control set which can be plugged into the telephone interface unit 26, and by means of which the serviceman can locally control and cause the read out of data in the same manner as the central station. Thus, when the serviceman is servicing the apparatus locally, he can test and make full use of the data acquisition and recording capabilities of the system.

It is one of the intersting features of the invention that a very large number of navigational aid transmitters can be monitored from a single central station. Because of the automatic long distance dialing capabilities of the telephone system, it is technically feasible for a single central station to control and to gather data from navigational aid transmitters located all over the country. Furthermore, as long as there is no real trouble, the routine data acquisition operations may be carried out entirely by means of a general purpose computer at the central station which is programmed to interrogate a prescribed list of navigational aid transmitters, and to record the data acquired from those transmitters in assigned sections of the computer memory. The computer program preferably includes branching features which cause the computer to recognize any alarming report and to print out a message to the human operator such as "Station XYZ at Cleveland, Ohio had a monitor shutdown at 12:15". The alarm print out can also include an immediate print out of special event data and operating condition data. Alternatively, that data can be made available immediately on request by the human operator.

In the routine operation of the system, since the operating data is recorded in memory A at a prescribed time or times during each day, the central station can interrogate the local system at any time before the next data recording time occurs. The memory A faithfully remembers what the operating conditions were at the prescribed recording time. Thus, in the typical arrangement in which data is recorded only once each day, the central station may interrogate each location during off peak load times, such as from 10:00 P. M. to 7:00 A. M. Furthermore, if the central station functions are performed by computer, the off peak times and off peak rates will apply to the use of the computer. Thus, the computer may be used for other purposes during the daytime, and devoted to the navigation aid transmitter control and data acquisition functions only at night.

Whenever the central station is connected to the system of FIG. 2, a so-called "modem" (modulator-demodulator) tone is continuously received from the central station. If that tone ceases, it is interpreted locally as indicating that the telephone connection has been disconnected, and the system then goes into a standby condition, awaiting another incoming call, or awaiting operations initiated locally. Furthermore, if the central station stays on the line, as signalled by a continuation of the modem signal, but no commands are received for a considerable period of time, then the local station will "hang up", assuming that the central station may be malfunctioning. This also results in the system going into the standby condition. The system also goes into standby condition in response to a direct command from the central station.

In addition to other special events which may be recorded, the special event detector, or the telephone interface unit 26, is preferably capable of recording a history of communications which have been attempted and successfully completed going outwardly from the system, and coming inwardly to the system. This information provides an indication as to whether the communication facilities of the system are operating correctly.

Up to this point, the description of the system has been entirely in terms of digital implementation. A digital implementation of this system is preferred because the data can be gathered, handled, and transmitted more rapidly and economically, and with greater accuracy. However, it is possible to implement the system in non-digital form and to accomplish virtually all of the functions described above in connection with a digital mechanization. In the simpler versions of the system, it may be more economical to mechanize the invention in a non-digital form.

FIG. 3 illustrates a modification of the invention employing non-digital technology, a version of the invention which is simpler than that illustrated and described in connection with FIGS. 1 and 2. Features of FIG. 3 which are common to FIG. 1 are identified by similar lettering. The various readings made by the multiplex unit 20 are detected and coded into a form which is directly transmittable over the telephone line by a voltage controlled oscillator unit 68, and the resultant output from the voltage controlled oscillator can be transmitted directly through a connection 70 to control unit 18 and thus to the telephone interface unit 26. In this version of the system, the multiplex unit 20 and the voltage controlled oscillator 68 may be operated continuously so that, by means of an incoming interrogation call, a continuous flow of data may be obtained at the central station indicating the status of the various readings within the navigation aid transmitter. In this continuous flow of data, the multiplex unit 20 is operable to provide a distinctive blank period, or some other distinctive signal, to signify the beginning of a new series of readings. The voltage controlled oscillator 68 may be a standard device having a basic oscillation frequency of 1.7 Khz, and having a deviation band width of 300 Hz depending on voltage input values.

The function of memory A in recording data at a prescribed predetermined time each day is fulfilled in the embodiment of FIG. 3 by means of a closed loop tape recorder 72, identified as "recorder A". Recorder 72 is normally maintained inoperable to record new data, continuing to maintain a record of previously recorded data until enabled at the prescribed time of day by a signal from clock 16. This recorder is then operable to record a full cycle of data from the voltage controlled oscillator 68 and to then discontinue recording to maintain storage of the data just recorded. This data may be supplied on command through the connection 74, the control 18, and the telephone interface 26 to the central station.

The recorder B is similar to recorder A and serves the function of the memory B previously described in connection with FIG. 2, by recording and holding a record of the measured conditions of the navigation aid transmitter just before a monitor shutdown. In this version of the system, the recorder B is simply left on, to continuously record the quantities detected by the voltage controlled oscillator 68 and the multiplex unit 20, and to continuously re-record those quantities as the multiplex unit continues to recycle. However, if there is a monitor shutdown, the monitor 12 issues a signal on line 76 to recorder B to disable the erase and recording heads so that the recorder B continues to contain and preserve the last previous series of measurements before the monitor shut down occurred. These measurements are therefore available to the central station through connection 78, control 18 and the telephone interface 26.

In a practical embodiment of the form of the invention illustrated in FIG. 3, the recorder A and the recorder B are combined in a single recorder mechanism employing multiple record tracks, separate tracks being assigned for the recorder A and the recorder B functions respectively. In order to prevent inaccuracy due to fluctuations in recorder speeds, a standard frequency reference signal may be recorded with the data signals from the voltage controlled oscillator 68.

Provisions are preferably included in the telephone interface 26 and control 18 for receiving from the central station over the telephone line 30 various control commands which can be carried to the transmitter 10 and monitor 12 over line 80. In a simple form of the invention, these commands may be transmitted by a sequence of different oscillator frequency tone pulses such as the pulses which can be generated by the now commonly available touch tone pushbutton dialing telephone instrument. The system is preferably arranged so that the tone commands are echoed back through the system so the central station can confirm that the commands were received.

In simplified modifications of the invention, the clock 16 and the recorder 72 may be omitted and reliance placed entirely upon taking direct readings through the telephone interface from the voltage controlled oscillator 68 to the central station over telephone line 30, whenever the telephone line connection is established by the central station. Thus, the time for taking periodic readings would be determined at the central station. In another simplified modification of the invention, the recorder 75 may be omitted, and reliance placed entirely upon the data last obtained by the central station either through direct readings from the voltage controlled oscillator 68, or from the recorder A.

With the embodiment of FIG. 3, 32 data channels may be provided with the single voltage controlled oscillator 68 which is shown. A reading speed of 40 samples per second is possible. Accordingly, a complete reading cycle can be accomplished well within a one second period. Not all of the 32 channels are necessarily available for data. In one detailed embodiment, three channels are occupied in signalling the beginning of the scan, three channels are occupied with calibration voltages, and two channels are occupied with internal commands. If additional capacity is required, a second voltage controlled oscillator may be added operating at a different basic frequency such as 2.3 KHz. An additional set of data then can be transmitted simultaneously with the 1.7 KHz data, at least doubling the data transmission capability without increasing the operating cycle time.

As in the embodiment of FIG. 1, the communication with the telephone line 30 through the interface unit 26 is carried out through an auto-dial unit 34. A modulator-demodulator is not required because there is no conversion between digital and oscillator tone signals. A data coupler 82 may also be required to couple the auto-dial unit to the telephone line, especially if the associated apparatus is manufactured by suppliers other than the Western Electric Company.

While the embodiment of FIG. 3 does not incorporate a special event detector and recorder, that too can be mechanized in non-digital form. For instance, a frequency tone code such as used for touch tone dialing can be used for the purpose of recording and transmitting numbers over the telephone line to thereby transmit special events data.

In each of the embodiments providing storage of data from the multiplex unit 20, the time of day of the recording of the data is preferably recorded along with the data. Thus, it is always possible for the central station to determine, by interrogation of the memories, not only the test data recorded in the memories, but also the time of day when the test data was taken.

The commands which can be carried out by the local system in response to messages received from the central station are very diverse. The commands may affect the operation of the control and data acquisition system, calling for the transmission of particular data, or the commands may relate to operation of the monitor or the transmitter, commanding shutdown or restart of either of these units. Recycling of the monitor may prove to "clear" a difficulty which would otherwise require shutdown of the transmitter.

While the multiplex unit 20 is represented in both FIGS. 1 and 3 as gathering data relating only to the navigation aid transmitter, it is understood that data may also be simultaneously gathered from the monitor 12 to determine whether the monitor is operating correctly. This is important because improper operation of the monitor may cause improper monitor shutdown of the transmitter, or may make the monitor incapable of properly monitoring the transmitter and thus prevent the monitor from causing a shutdown of the transmitter when the transmitter is not operating correctly.

The system is described above, particularly in connection with FIGS. 1 and 2, in terms of a capability of the system to call out from an individual station through the telephone interface 26 back to the central station to notify the central station under certain special conditions. These conditions include a shutdown of the system by the monitor, or a filling up of the special event processor memory, indicating a continuing, or much repeated, special event situation. It will be understood that the system may also be arranged to initiate call-out to the central station in response to a single occurrence of special conditions other than a complete shutdown of the system by the monitor. For instance, certain special events or special conditions may be so serious, and may be such a dangerous threat to the continued safisfactory operation of the system that an immediate notification to the central station is desirable. Such conditions may include, for instance, an extreme tilted position of one of the transmitter antennas, power loss by the system for more than a predetermined period of time, frequency drift beyond allowable limits, or a condition in which any measurement falls outside of allowable tolerance limits, either in a single occurrence, or continuing beyond a predetermined time limit.

Emphasis is placed above on the capability by the system to use ordinary telephone lines, which are not dedicated lines, for establishing communication between the central station and the individual transmitter station. It will be understood that the term telephone, as used in this connection, is not necessarily intended to be restricted to wired telephone interconnections. thus, it is well known that in present practice, many commercial telephone links are completed by radio. Furthermore, it is within the scope of this invention to employ radio-telephone or radio terminal equipment either at the central station, or at the individual transmitter station, or both, rather than employing telephone terminal equipment. However, the telephone type of terminal equipment is preferred. The vital feature is that, whether employing wired telephone links, or radio links, the system does not require the use of dedicated lines, or dedicated channels, but rather can rely upon the automatic establishment of connections from time to time as needed. Furthermore, the references to telephone lines may be considered, in the broadest sense, to include other voice band width communication links.

The system provides for broad flexibility of operation. For instance, in addition to all of the other possible variations in system operation, the central station may command the local station to operate, through the closure control unit 44 of FIG. 2, to change or shift various electrical operating conditions of the local system (including the transmitter, the monitor, or the data acquisition system elements). At the same time, the system operates to cause a read-out operating data while those conditions are changed or shifted, in order to check for system integrity. Such an operation can be carried out as part of the normal routine when the previously stored operating data in memory A is called out from the local station by the central station interrogation. By this means, the dynamic operating characteristic of the system are checked to make sure that the system is operating correctly and efficiently.

The system of this invention is particularly useful for a navigation aid transmitter. However, it is apparent that the system can be employed for the remote acquisition of data on operating conditions of other kinds, and from other sources.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A remote operating condition data acquisition system comprising
    means for sequentially taking data readings indicative of a plurality of different operating conditions of an associated electronic apparatus,
    said sequential data reading means being dedicated to the taking of data readings relating to the operation of said associated electronic apparatus and being operable independent of sequence initiation signals from an outside source,
    means coupled to said sequential data reading means for converting said data readings to a form which can be transmitted over a voice band-width communication link,
    a voice link interface means coupled to said converting means,
    means coupled with said converting means and said interface means for storing said data readings for subsequent read-out,
    said interface means being operable to establish a connection with a non-dedicated voice channel for transmitting said converted data readings from said data storage means over the voice channel to a central station remote from said system.

2. A system as claimed in claim 1 wherein said interface means is operable to establish the connection to the communication link for transmitting the data readings in response to an incoming interrogation call.

3. A system as claimed in claim 1 wherein there is provided a time clock and a control means operable to cause recordation of said operating condition data readings in said data storage means at predetermined time intervals.

4. A system as claimed in claim 1 wherein said remote operating condition data acquisition system comprises a single station in a network of similar data acquisition systems, said network including a central station connected and arranged with communication link call-out equipment to establish connections to each of said remote data acquisition systems.

5. A system as claimed in claim 1 wherein said sequential data reading means comprises a multiplex cycling switch means connected for detecting said different operating conditions in sequence in terms of voltages, and a single voltage conversion device connected to said multiplex switching means for operation sequentially to convert a plurality of the voltages from said multiplex switch means to electrically recordable signals.

6. A system as claimed in claim 5 wherein said voltage conversion device comprises a digital voltmeter.

7. A system as claimed in claim 5 wherein said voltage conversion device is combined in said means for converting said data readings to a form which can be transmitted over a voice band-width communication link.

8. A system as claimed in claim 7 wherein said voltage conversion device comprises a voltage controlled oscillator.

9. A system as claimed in claim 1 wherein there is provided means responsive to command signals received over the voice channel through said voice link interface means, said means for receiving said command signals being operable for carrying out the commands, the commands being commands affecting the electronic apparatus.

10. A system as claimed in claim 1 wherein there is provided means for detecting at least one special event affecting the operating conditions of said electronic apparatus, a storage means for storing an indication of the occurrence of the special event, said storage means being operable to supply the special event indication through said voice link interface means along with the data readings over the voice channel.

11. A system as claimed in claim 10 wherein there is provided a time clock, said storage means being connected to said time clock for storing an indication of the time from said time clock when the special event is detected, said storage means being operable to provide said time indication along with the special event indication through said voice link interface means.

12. A system as claimed in claim 10 wherein there is included means for detecting the condition when said special event storage means is full, a control means connected to receive a signal from said detecting means indicating that said storage means is full, said control means being connected to said voice link interface means and operable in response to said special event storage means full signal for establishing an outgoing connection to transmit the storage special event information over the voice channel.

13. A system as claimed in claim 1 wherein there is provided a monitoring apparatus operable to monitor the useful signal outputs of the electronic apparatus and to detect a malfunction of the electronic apparatus in terms of a failure to deliver an accurate signal output, said data storage means being coupled to said monitor and operable in response to the detection of a malfunction of the electronic apparatus for recording said operating data readings.

14. A system as claimed in claim 13 wherein said voice link interface means includes means for initiating an outgoing connection, a control means operable to receive the malfunction signal from said monitor, said control means being operable in response to said malfunction signal to actuate said voice link interface means to initiate an outgoing connection to provide a message on a voice channel to a central station to indicate the malfunction of the apparatus and to transmit the data stored in said data storage means to said central station to indicate the operating conditions of said apparatus at the time of malfunction.

15. A system as claimed in claim 13 wherein there is provided means operable after a predetermined delay for shutting down said apparatus in response to a detection of a malfunction by said monitor.

16. A system as claimed in claim 13 wherein said sequential data taking means is operable to take a plurality of different data readings indicative of a plurality of different operating conditions of said monitor as well as the operating conditions of said apparatus.

17. A system as claimed in claim 1 wherein said electronic apparatus is a radio navigation aid transmitter, and the useful signal outputs are radiated radio navigation aid guidance signals.

18. A system as claimed in claim 1 wherein said voice band-width communication link is a telephone link, said voice link interface means is a telephone interface means, and said voice channel is a telephone line.

* * * * *

UNITED STATES PATENT OFFICE
CERTIFICATE OF CORRECTION

Patent No. 3,820,074        Dated June 25, 1974

Inventor(s)    DONALD J. TOMAN

It is certified that error appears in the above-identified patent and that said Letters Patent are hereby corrected as shown below:

```
Column 4,   line 14, cancel "other";
            line 20, "Thi" should read --This--.
Column 5,   line 24, "command" should read --commanded--;
            line 53, "trenamitted" should read --transmitted--.
Column 6,   line 26, "Menory" should read --Memory--;
            line 36, "Thus" should read --This--;
            line 39, "Menory" should read --Memory--;
            line 63, after "event" insert --signals--.
Column 7,   line 60, "ar" should read --are--.
Column 11,  fourth line from bottom, "thus" should read --Thus--.
Column 12,  lines 27 and 28, "characteristic" should read
                    --characteristics--.
Column 14,  line 13, "storage" should read --stored--.
```

Signed and sealed this 17th day of September 1974.

(SEAL)
Attest:

McCOY M. GIBSON JR.            C. MARSHALL DANN
Attesting Officer             Commissioner of Patents